US006134054A

United States Patent [19]
Abe

[11] Patent Number: 6,134,054
[45] Date of Patent: Oct. 17, 2000

[54] MONOCHROMATIC IMAGE FORMING OPTICAL SYSTEM AND MONOCHROMATIC FILTERING OPTICAL SYSTEM

[75] Inventor: Tetsuya Abe, Hokkaido, Japan

[73] Assignee: Asahi Kogaku Kogyo Kabushiki Kaisha, Tokyo, Japan

[21] Appl. No.: 09/222,304

[22] Filed: Dec. 28, 1998

[30] Foreign Application Priority Data

Dec. 26, 1997 [JP] Japan ................................. 9-361493

[51] Int. Cl.[7] ................. G02B 13/00; G02B 9/00; G02B 9/12
[52] U.S. Cl. ........................ 359/722; 359/738; 359/784
[58] Field of Search ........................ 359/722, 885–891, 359/723, 738, 744, 784, 771, 785

[56] References Cited

U.S. PATENT DOCUMENTS 4,687,926  8/1987  Plummer ................................. 250/226

*Primary Examiner*—Scott J. Sugarman
*Assistant Examiner*—David N. Spector
*Attorney, Agent, or Firm*—Greenblum & Bernstein, P.L.C.

[57] ABSTRACT

A monochromatic image observing optical system is provided with an objective lens, a negative lens group, a monochromatic filter and a positive lens group that are arranged in this order from an object side. The monochromatic filter is a narrow bandpass interference filter. The objective lens and the negative lens constitute an afocal system on the image side, and the positive lens has a power that counterbalances the power of the negative lens group. The monochromatic filter is arranged between the negative and positive lens groups.

24 Claims, 7 Drawing Sheets

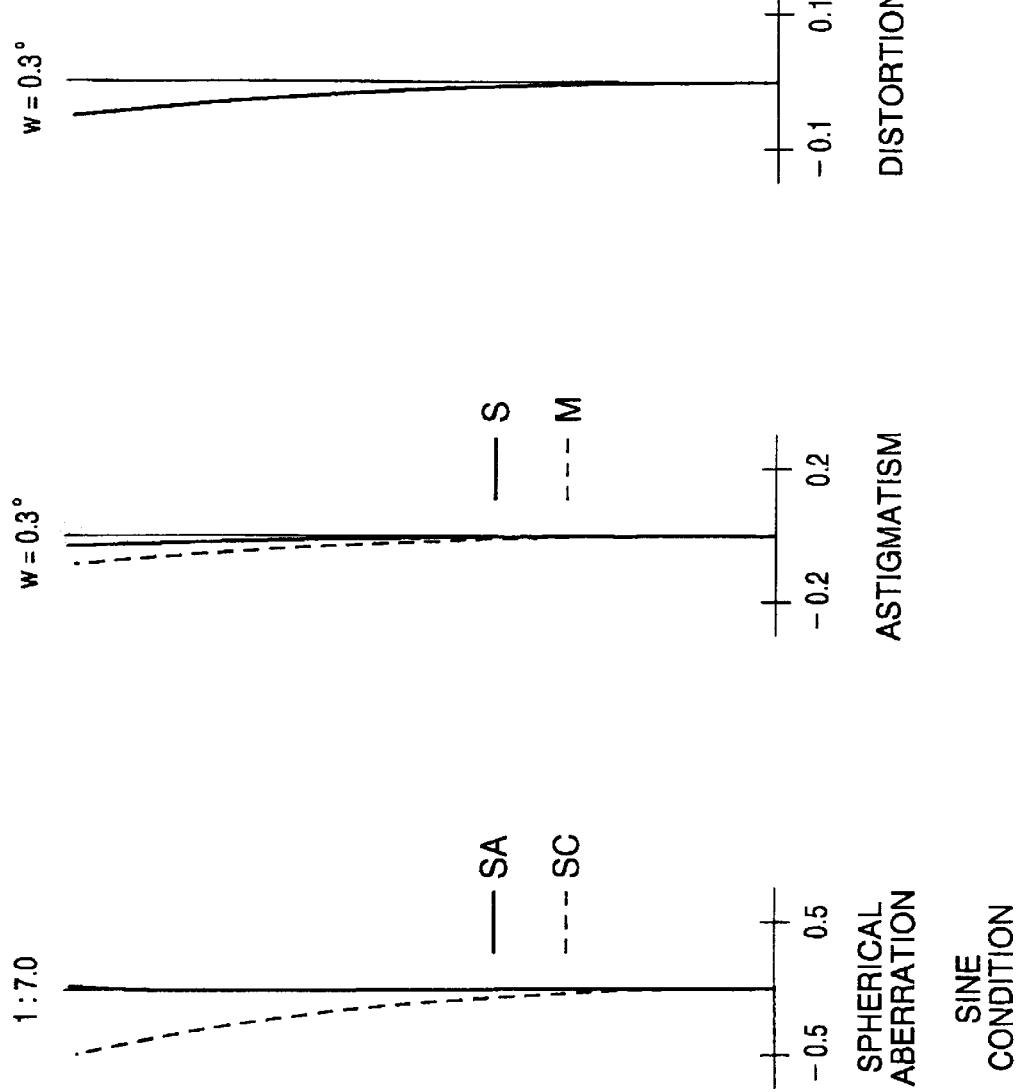

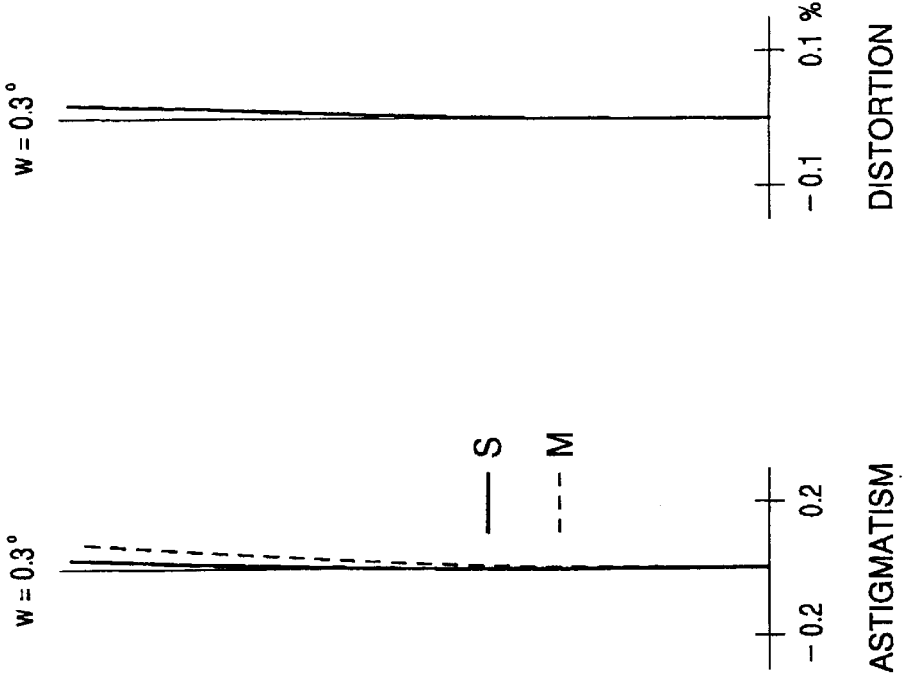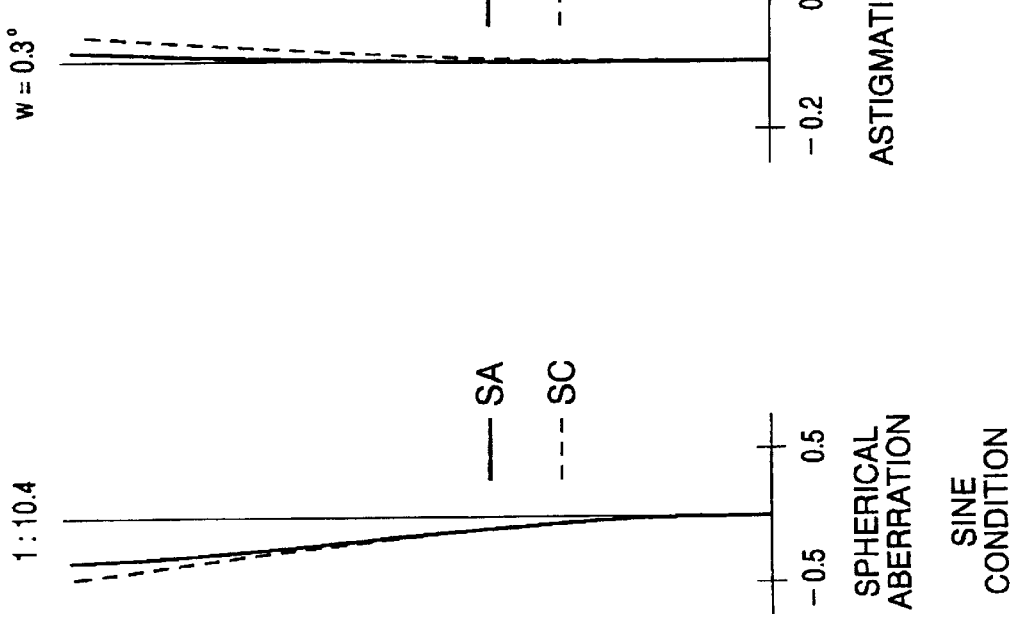

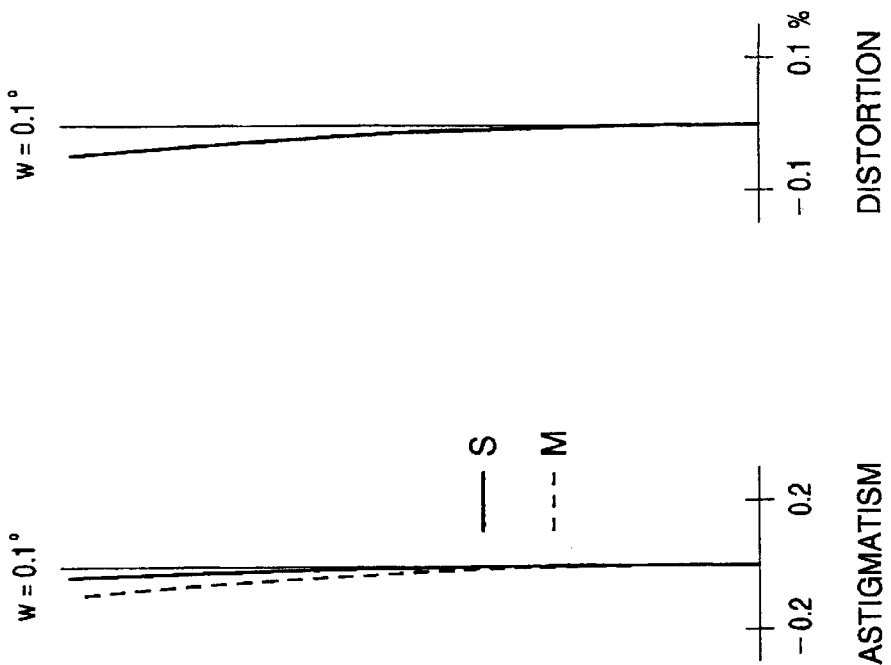
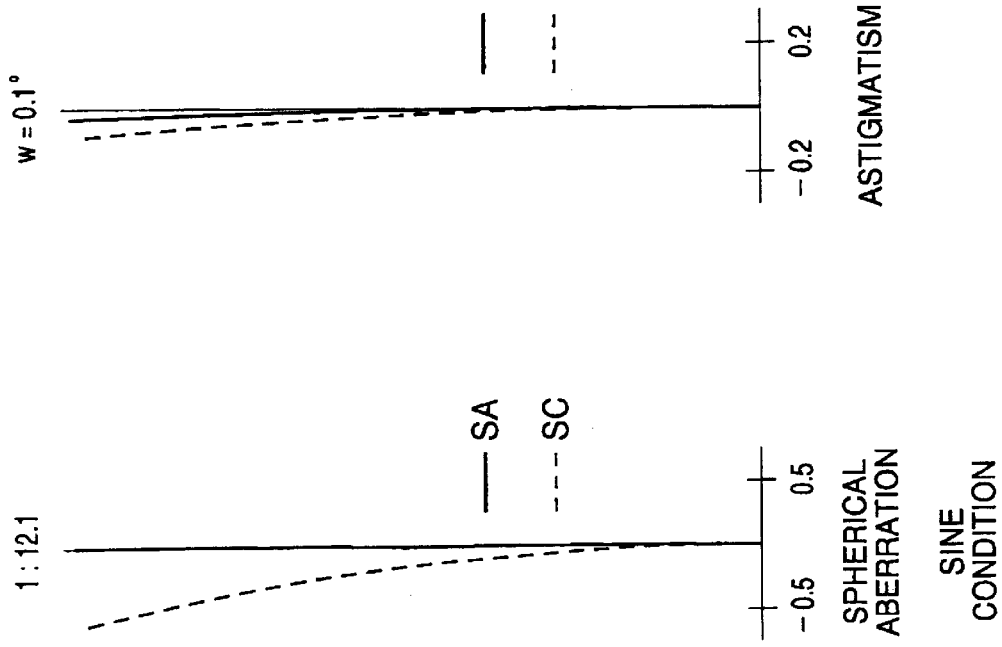

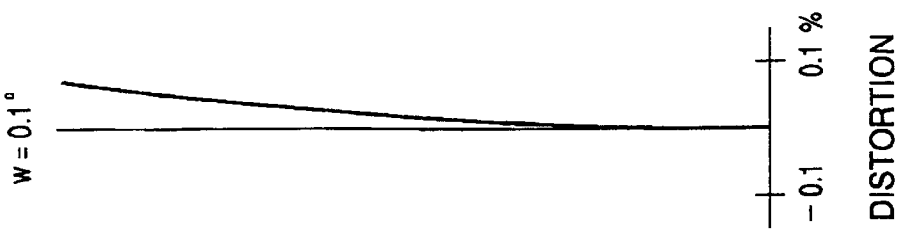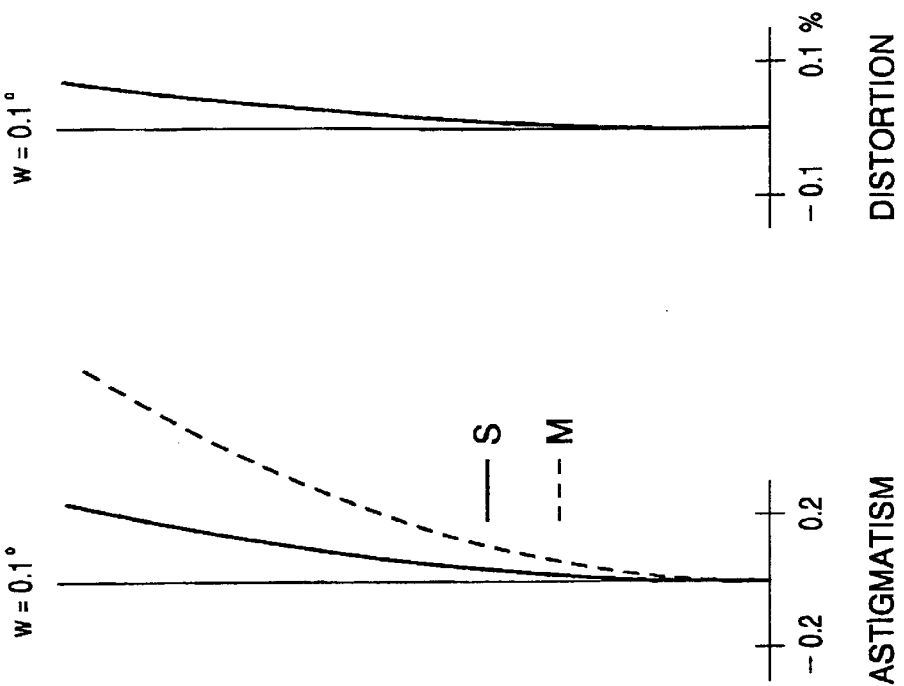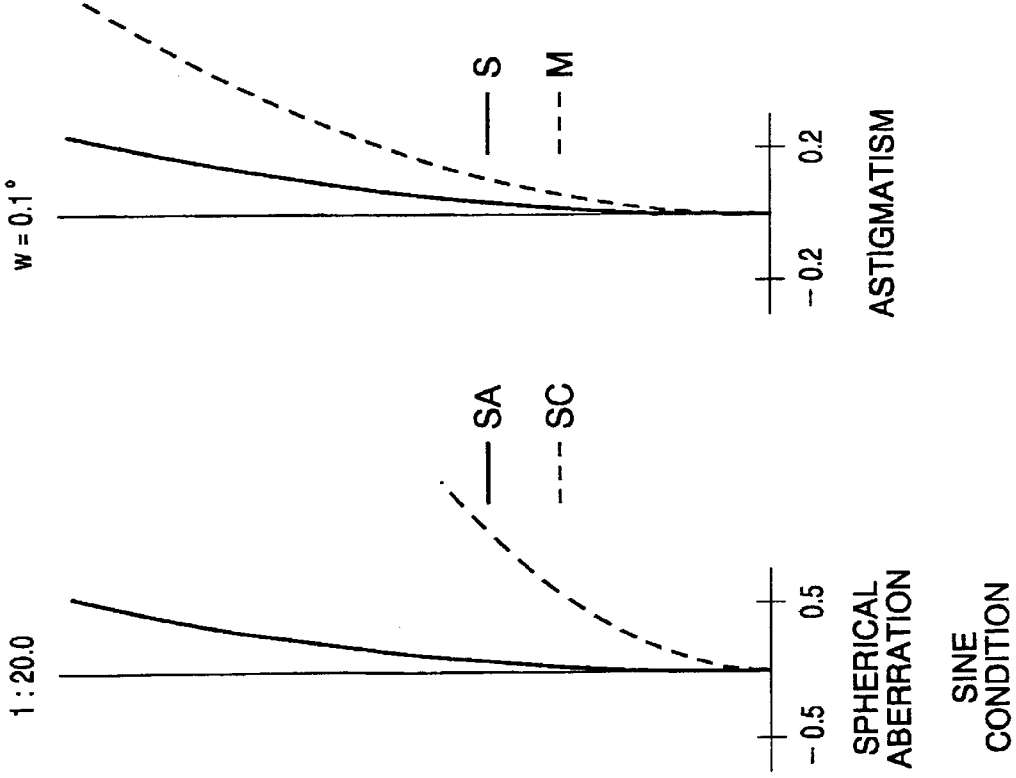

MONOCHROMATIC IMAGE FORMING OPTICAL SYSTEM AND MONOCHROMATIC FILTERING OPTICAL SYSTEM

BACKGROUND OF THE INVENTION

The present invention relates to a monochromatic image forming optical system that is used for an observing system used for observations of the sun, and to a monochromatic filtering optical system employed in the monochromatic image forming optical system.

In the art of observations of the solar activity, light of very narrow wavelength range (about 0.05–0.1 nm) which can be regarded as monochromatic light, is used to form an image of the sun for observations. In general, the narrow wavelength range is defined by a bandwidth and its center wavelength of 656.3 nm (Hα-line). To form such an image, i.e., the monochromatic image of the sun, a narrow bandpass interference filter is used as a monochromatic filter, which is located in an optical system of an astronomical telescope. The interference filter is located at a position adjacent to an image plane of an objective lens of the astronomical telescope such that the filter is orthogonal to the optical axis of the astronomical telescope.

Generally, the interference filter has an incident angle dependency. That is, the transmission characteristics (i.e., a relationship between transmittance and wavelength) varies as the incident angle varies. If an interference filter is designed for light which is incident on the filter at right angles, and if light is incident on the filter obliquely, an actual transmitting wavelength range shifts from a designed wavelength range. That is, when the incident angle of the incident light is different from the designed angle, the center wavelength of the wavelength range shifts from the designed one. Further, the narrower the designed bandwidth of an interference filter is, the smaller the allowable range of the incident angle is.

If the optical system consists of the objective lens and the monochromatic filter (i.e., the narrow bandpass interference filter) as described above, within axial rays incident on the monochromatic filter via the objective lens, the rays incident on the filter at a small ray height (i.e., the height with respect to the optical axis) has relatively small incident angles which can be regarded as approximately 0 degree; while, the rays incident on the filter at a large ray height are incident on the filter at relatively large incident angles.

Since the center wavelength of the wavelength range of the transmitting rays varies depending on the incident angle, the center wave length of the wavelength range of the light passed through the filter is shifted from the designed one, which lowers contrast of an image.

FIG. 7 shows a conventional optical system that includes an objective lens 1, a negative lens group 2, a positive lens group 3, and a monochromatic filter 4. In this optical system, by arranging the negative lens group 2 in the vicinity of an image formed by the objective lens 1, the focal length of the objective lens 1 is expanded, and the F-number of the entire system is increased. Further, the positive lens group 3 is arranged in the vicinity of the monochromatic filter 4 to constitute a telecentric system on an image plane 5 side.

With this construction, since the F-number is relatively large, the difference of the incident angles due to the difference of the incident ray heights onto the monochromatic filter 4 can be reduced. Further, the telecentric system reduces variation of the incident angle due to the difference of the image size. Therefore, the center wavelength of the transmission wavelength range will not be shifted in the entire area of the image plane, thereby providing high contrast monochromatic images.

The optical system of FIG. 7, however, has a problem such that the monochromatic filter 4 should be arranged at a position relatively close to the image plane 5 since the negative lens group 2 and the positive lens group 3 should be arranged sufficiently apart from each other to reduce coma and spherical aberration with respect to offaxial rays. Since the monochromatic filter 4 is close to the image plane 5, dust and/or dirt adhered onto the filter surface may easily cause shadow and/or flare to be formed in the image on the image plane 5. Further, as the distance between the lens groups 2 and 3 is made longer, the backfocus becomes shorter, which restricts an applicable type of an observing device such as an eyepiece or a camera.

Furthermore, since the focal length of the objective lens 1 is expanded with the negative lens group 2 in the optical system shown in FIG. 7, the size of the entire optical system is increased, and the size of the monochromatic image formed on the image plane is also increased as compared with the normal optical system consisting of the objective lens and the monochromatic filter. In order to capture the large-size image with a generally-used image capturing element such as a CCD (Charge Coupled Device), an additional optical system for reducing the size of the image is required.

SUMMARY OF THE INVENTION

It is therefore an object of the present invention is to provide an improved monochromatic image forming optical system and a monochromatic filtering optical system employed therein which are capable of preventing dirt and/or dust adhered on the monochromatic filter from affecting the image without increasing the entire size of the optical system as well as the image size as compared with the conventional monochromatic image forming optical system consisting of an objective lens and a monochromatic filter.

According to one aspect of the present invention, there is provided a monochromatic image forming optical system for forming a monochromatic image on an image plane using a monochromatic filter. The monochromatic image forming optical system is further provided with an objective lens group, a negative lens group located between the objective lens group and the image plane, and a positive lens group located between the negative lens group and the image plane. The monochromatic filter is located between the negative lens group and the positive lens group.

With this construction, light converged by the objective lens is then diverged with the negative lens group so that light enters the monochromatic filter at relatively small incident angles. The light passed through the filter is converged by the positive lens group to form an image on the image plane.

Preferably, the objective lens group and the negative lens group constitute an afocal system on the image plane side.

The monochromatic filter can be located any position between the negative lens group and the positive lens group, and therefore, can be located at a position sufficiently far from the image plane. Further, the diameter of the light beam passed through the monochromatic filter can be sufficiently large regardless of the large F-number of the entire optical system. Therefore, dust and/or dirt adhered on the filter surface will not cause shadow and/or flare of the image formed on the image plane.

The focal length of the positive lens group is arbitrarily defined so as to counterbalance the powers of the negative and positive lens groups, which makes it possible to provide a long back focus. Therefore, any observing device that requires a long flange back can be used.

In a preferred embodiment, the monochromatic image forming optical system satisfies the following conditions:

(1) $|1/fII+1/L|<0.01$
(2) $0.00001<|1/fII+1/L|$
(3) $0.1<|fII/fI|<0.5$ where fI is a focal length of the objective lens group, fII is a focal length of the negative lens group; and L is a distance between a secondary principal point of the negative lens group and the image plane of the objective lens group.

It is preferable that the positive lens group is selected from a plurality of lens groups respectively having various focal lengths so that the size of the monochromatic image can be varied or adjusted.

It is further desirable that the following conditions are satisfied. The conditions are:

(4) $0.005<Y/fIII<0.05$,
(5) $-2.0<fIII/fII<-0.5$, where

Y is a radius of an observing area of the observing device; and fIII is a focal length of the positive lens group.

At least one of the positive lens group and the negative lens group is preferably constructed of a single lens.

According to another aspect of the invention, there is provided a monochromatic filtering optical system for an observation optical system including an objective lens and a device for observing an image formed by the objective lens. The monochromatic filtering optical system includes a negative lens group located between the objective lens sand the observing device, a positive lens group located between the negative lens and the observing device, and a monochromatic filter located between the negative lens group and the positive lens group.

It is preferred that the monochromatic filtering optical system satisfies at least one of the above conditions (1) through (5).

BRIEF DESCRIPTION OF THE DRAWING

FIGS. 3A–3C show spherical aberration, astigmatism, and distortion of the monochromatic image forming optical system according to a first embodiment, respectively;

FIGS. 4A–4C show spherical aberration, astigmatism, and distortion of the monochromatic image forming optical system according to a second embodiment, respectively;

FIGS. 5A–5C show spherical aberration, astigmatism, and distortion of the monochromatic image forming optical system according to a third embodiment, respectively;

FIGS. 6A–6C show spherical aberration, astigmatism, and distortion of the monochromatic image forming optical system according to a fourth embodiment, respectively.

DETAILED DESCRIPTION OF THE PREFERRED EMBODIMENTS

Figure 1:
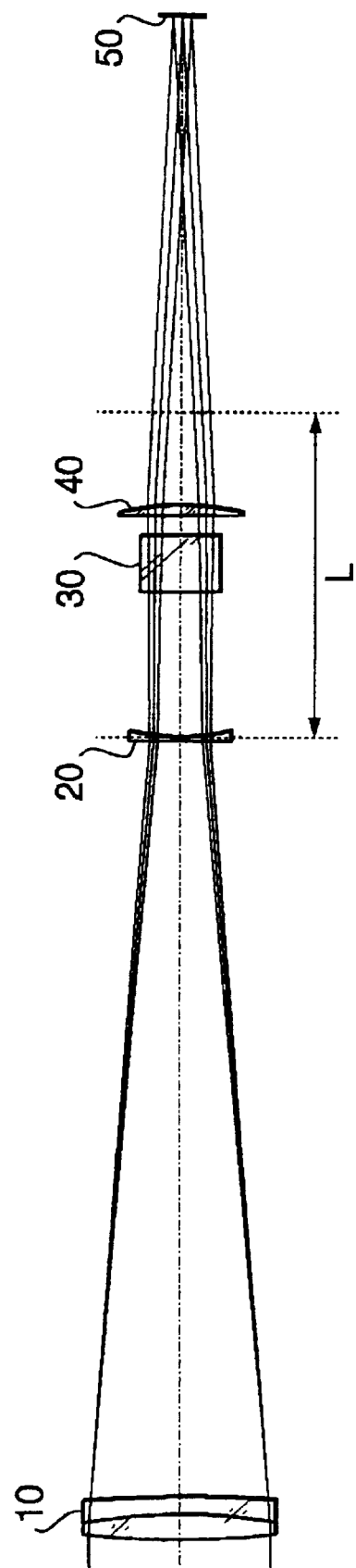
FIG. 1 schematically shows a lens diagram of a monochromatic image forming optical system according to the present invention.

FIG. 1 schematically shows a structure of a monochromatic image forming optical system according to an embodiment of the present invention. The monochromatic image forming optical system includes, as shown in FIG. 1, an objective lens 10, a negative lens group 20, a monochromatic filter 30, and a positive lens group 40, which are arranged in this order from an object side (i.e., from the left-hand side to the right-hand side in FIG. 1). The monochromatic filter 30 is a narrow bandpass interference filter. In the embodiment, each of the negative lens group 20 and the positive lens group 30 consists of a single lens. An observing device such as a CCD camera or an eyepiece is arranged at an image plane 50.

The objective lens 10 and the negative lens 20 constitute an afocal system on the image side. Light converged by the objective lens 10 and then diverged by the negative lens group 20 is incident on the monochromatic filter 30. The light passed through the monochromatic filter 30 is converged by the positive lens group 40 to form an image of an object to be observed on the image plane 50. Since the afocal system is constituted, the incident angle of the rays incident on the monochromatic filter 30 can be maintained relatively small, the center wavelength of the wavelength range of the light passed through the monochromatic filter 30 can be maintained substantially at a predetermined wavelength, and accordingly, a high contrast monochromatic image can be formed.

The positive lens group 40 has a positive power that counterbalances the negative power of the negative lens group 30. Accordingly, aberrations such as coma and the spherical aberration are also counterbalanced, which results high performance in an image characteristic.

The powers of the negative and positive lens groups should be counterbalanced. However, the focal length of the positive lens group 40 is arbitrary defined, and accordingly a back focus can be made longer. Therefore, any observing device that requires long flange back can be used. Further, the focal length of the entire optical system can be made substantially identical to that of the objective lens 10. Therefore, the monochromatic image will not be made too large.

Further, according to the arrangement shown in FIG. is 1, the monochromatic filter 30 can be located at any position, between the negative lens group 20 and the positive lens group 40, which is far from the image plane 50. Furthermore, the diameter of the light beam incident on the monochromatic filter 30 can be made large regardless of the F-number of the entire optical system. Therefore, dust and/or dirt adhered on the filter surface may not form shadow and/or flare in the image formed on the image plane 50.

It should be noted that the negative lens group 20 in FIG. 1 is required to have a diverging function, but is not required to have a large negative power. Thus, high performance free from coma and the spherical aberration is obtained.

Figure 7:
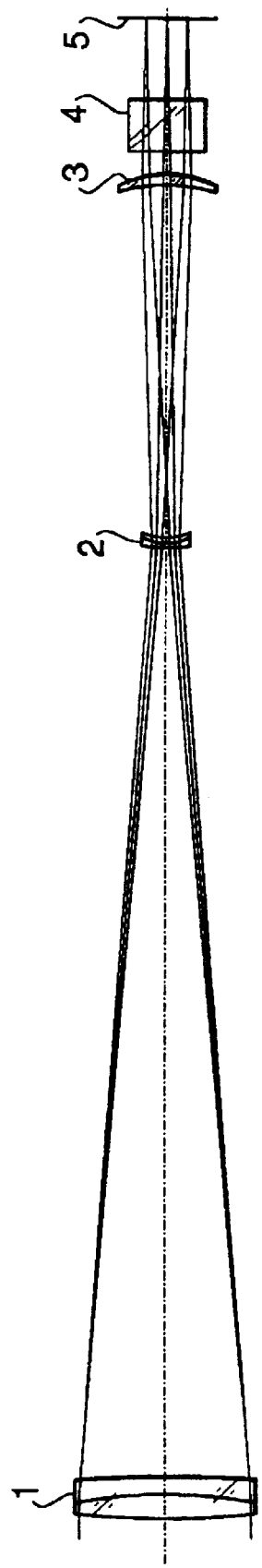
FIG. 7 is a lens diagram of a conventional monochromatic image forming optical system.

Still further, the total length of the optical system shown in FIG. 1 is a sum of the focal length of the objective lens 10 and a distance from the negative lens group 20 to the positive lens group 40, and the distance between the lens groups 20 and 40 can be determined arbitrarily as far as the space for the monochromatic filter 30 is remained. Therefore, the total length of the optical system of FIG. 1 can be made shorter than that of the conventional optical system shown in FIG. 7.

The monochromatic filter 30 allows light whose wavelength range is 656.3 nm±0.05 nm (the center wavelength being 656.3 nm) to pass through, when the light is incident at right angles, and the permissible incident angle is within a range of approximately ±5 degrees.

The monochromatic image forming optical system of the embodiment satisfies the following conditions:

(1) $|1/fII+1/L|<0.01$,
(2) $0.00001<|1/fII+1/L|$,
(3) $0.1<|fII/fI|<0.5$, where fI is a focal length of the objective lens 10, fII is a focal length of the negative lens group 20; and L is a distance between a secondary principal point of the negative lens group 20 and the image plane of the objective lens 10.

Condition (1) defines the diverging function of the negative lens group 20 to maintain the incident angle onto the monochromatic filter 30 within the permissible range. If the left side of condition (1) exceeds the upper limitation (i.e., the right side), the divergent power of the negative lens group 20 becomes too large. In such a case, the incident angle of the rays, which is incident at the high ray height, onto the monochromatic filter 30 exceeds the permissible range, which widens the transmission wavelength range of the monochromatic filter 30.

In general, the monochromatic filter 30 is a plane-parallel plate. A plane-parallel plate causes a ghost due to surface reflections on an incident surface and an exit surface. Condition (2) defines that the light beam incident on the monochromatic filter 30 is slightly divergent or convergent. If condition (2) is satisfied, the surface reflection light is diffused and weakened. If the right side of condition (2) is smaller than the lower limit (i.e., the left side of condition (2)), the light emerged from the negative lens group 20 will be considered as parallel light. In this case, the surface reflection light emerged from the monochromatic filter 30 is conspicuous as the ghost, on the image plane 50.

It becomes more difficult to keep even transmission characteristics over the entire effective area of the narrow bandpass interference filter as the effective diameter thereof becomes larger. Therefore, the effective diameter of the narrow bandpass interference filter is about 10 to 50 mm in general. On the other hand, the effective diameter of an objective lens generally employed in a telescope for observing the sun is 50 to 150 mm.

According to the structure shown in FIG. 1, the light beam emerged from the negative lens group 20 is substantially parallel, and accordingly, the combination of the objective lens 10 and the negative lens group 20 as a Galilean telescope. Consequently, a ratio of the diameter of the light beam emerged from the negative lens group 20 to the diameter of the light beam incident on the objective lens 10 is substantially equal to the telescope magnification of the combination of the objective lens 10 and the negative lens group 20. The telescope magnification is expressed as a ratio of the focal length of the negative lens group 20 to that of the objective lens 10.

An incident angle of a principal ray incident on the monochromatic filter 30 is substantially equal to the angle that is the product of a half view angle of an object by the telescope magnification described above. For observations of a monochromatic image of the sun, taking the fact that the half view angle of the sun is about 0.3 degrees into account, the focal length of the negative lens group 20 should be determined so that the incident angle on the monochromatic filter 30 falls within the allowable range of ±5 degrees.

Condition (3) defines a range of the ratio of the focal length of the negative lens group 20 to that of the objective lens 10. When condition (3) is satisfied, the light converged by the objective lens 10 of which effective diameter is about 50 to 150 mm is efficiently introduced into the monochromatic filter 30 of which diameter is about 10 to 50 mm, and further the incident angle is maintained within the allowable range.

If the ratio of condition (3) is larger than the upper limit (i.e., the right side), the diameter of the incident light beam to the monochromatic filter 30 is too large, the monochromatic filter 30 eclipses a part of the light beam converged by the objective lens 10.

On the contrary, if the ratio of condition (3) is smaller than the lower limit (i.e., the left side), the telescope magnification of the combination of the objective lens 10 and the negative Lens group 20 is too large. In this case, the entire image of the sun cannot be obtained.

In the monochromatic image forming optical system according to the embodiment, a positive lens group 40 is selected from among a plurality of lens groups having various focal lengths so that the size of the monochromatic image can be arbitrarily adjusted. By changing the positive lens group 40, the size of the monochromatic image can be changed, which allows to use various types of observing device.

It should be noted that if the focal length of the positive lens group 40 is too short (i.e., the positive power is too large), the rays at large incident ray height, which have wavelength outside the predetermined transmission wavelength range, are also introduced to the observation area, thereby decreasing contrast of the image. Because the rays at large incident ray height enter the monochromatic filter 30 at large incident angles, the center wavelength of the transmission wavelength range shifts from that for the rays of small incident ray height. If the focal length of the positive lens group 40 is too long, the image of the sun is too large and the entire image of the sun is not observable. In other words, the ray incident on the monochromatic filter 30 at a larger ray height has a larger incident angle, and accordingly the center wavelength of the transmission wavelength range for such a ray shifts, thereby lowering the contrast of the image at the peripheral portion thereof.

To avoid the above problem, the focal length of the selectable positive lens group 40 should be determined so as to satisfy the following conditions (4) and (5).

(4) $0.005<Y/fIII<0.05$,
(5) $-2.0<fIII/fII<-0.5$, where

Y is a radius of an observing area of the observing device; and fIII is a focal length of the positive lens group 40.

Condition (4) defines the focal length of the positive lens group 40 with respect to the size of the observing device. When condition (4) is satisfied, a monochromatic image will have an appropriate size within the observing area. If the ratio Y/fIII is lower than the lower limit, the focal length of the positive lens group 40 is too long, and the size of the image is too large. Accordingly, it becomes difficult to observe the entire image.

If the ratio Y/fIII is greater than the upper limit of condition (4), offaxial rays having wavelength outside the predetermined transmission wavelength range are also introduced in the observation area. Accordingly, contrast of the image is lowered at peripheral portions of the observation area.

Since the negative power of the negative lens group 20 and the positive power of the positive lens group 40 in the monochromatic filtering optical system according to the embodiment are counterbalanced, aberrations are well compensated when taken the entire optical system. Accordingly, aberrations need not be compensated in each of the lens groups. Therefore, each of the lens groups can be formed as a single piece lens, which enables cost reduction of the optical system.

Condition (5) defines ratio of the focal length of the positive lens group 40 to that of the negative lens group 20. If condition (5) is satisfied, various aberrations can be well compensated. If the ratio fIII/fII is smaller than the lower limit of condition (5), the power of the negative lens group 20 becomes too large (strong), which causes negative spherical aberration and coma excessively. If the ratio fIII/fII is larger than the upper limit of condition (5), the power of the positive lens group 40 becomes too large, which causes positive spherical aberration and coma excessively.

Next, numerical embodiments are described.

[First embodiment]

Figure 2:
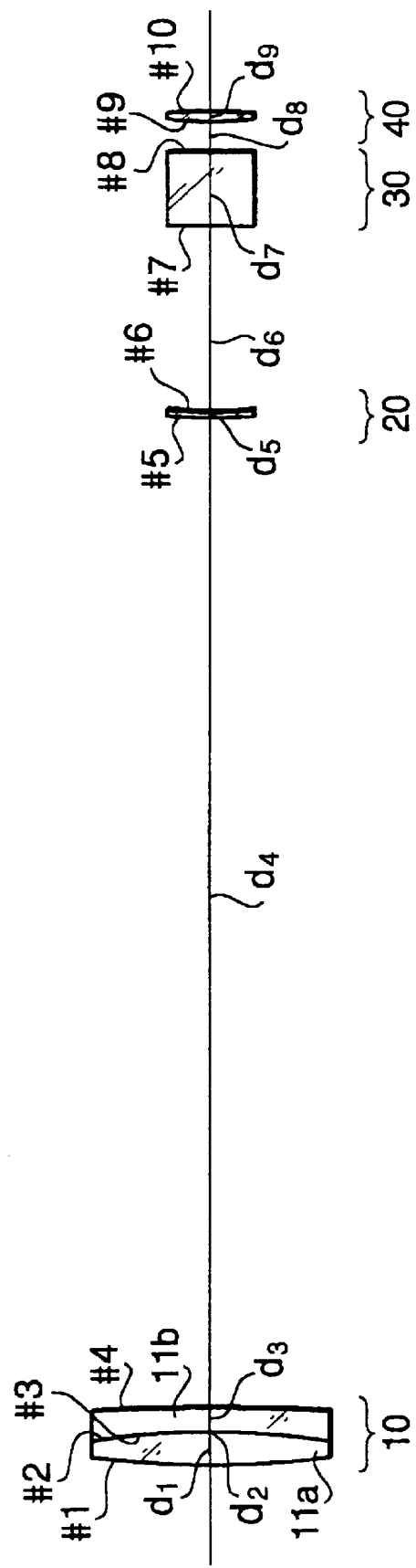
FIG. 2 is a lens diagram of the monochromatic image forming optical system according to a first embodiment of the invention.

FIG. 2 shows a concrete construction of the monochromatic image forming optical system according to the first embodiment. The optical system has the objective lens 10 which is a cemented lens including a biconvex lens 11a and a negative meniscus lens 11b, the negative lens group 20 that consists of a plano-concave lens, the monochromatic filter 30, and the positive lens group 40 consists of a biconvex lens.

The numerical construction of the first embodiment is indicated in TABLE 1.

In the following tables, FNO. denotes an F-number, f (mm) denotes a focal length, fB (mm) denotes a backfocus (distance between the last surface and the image plane), r (mm) denotes a radius of curvature of a surface, d (mm) denotes a distance between the surfaces along the optical axis, n denotes a refractive index at a wavelength of 588 nm (d-line) and νd denotes an Abbe number.

The surface numbers #1 to #4 represent the surfaces of the objective lens 10, the surface numbers #5 and #6 represent the surfaces of the negative lens group 20, the surface numbers #7 and #8 represent the surfaces of the monochromatic filter 30, and the surface numbers #9 and #10 represent the surfaces of the positive lens group 40.

In the first embodiment, the incident angle of the highest principal ray with respect to the monochromatic filter 30 is 0.96°. The transmission wavelength range of the monochromatic filter 30 is 656.3±0.05 nm (the center wavelength range being 656.3 nm).

TABLE 1

| FNo. 1:7.0 Surface Number | f = 521.67 mm r | W = 0.3° d | fB = 144.59 mm n | vd |
|---|---|---|---|---|
| #1 | 320.500 | 11.00 | 1.56883 | 56.3 |
| #2 | −231.634 | 0.20 | | |
| #3 | −231.000 | 7.50 | 1.69895 | 30.1 |
| #4 | −873.165 | 341.88 | | |
| #5 | ∞ | 1.50 | 1.51633 | 64.1 |
| #6 | 82.630 | 65.70 | | |
| #7 | ∞ | 25.00 | 1.51633 | 64.1 |
| #8 | ∞ | 10.00 | | |
| #9 | 94.500 | 4.00 | 1.51633 | 64.1 |
| #10 | −623.440 | | | |

FIGS. 3A–3C show aberrations of the first embodiment at the wavelength of 656.3 nm. FIG. 3A shows a spherical aberration SA and a sine condition SC, FIG. 3B shows an astigmatism (S: Sagittal, M: Meridional) and FIG. 3C shows distortion. The vertical axis represents F-number in FIG. 3A, a half view angle w (degree) in FIGS. 3B and 3C. Unit of the horizontal axis is "mm" in each of FIGS. 3A and 3B and "percent" in FIG. 3C.

[Second embodiment]

The numerical construction of the second embodiment is indicated in TABLE 2. FIGS. 4A–4C show aberrations of the second embodiment at the wavelength of 656.3 nm. Due to the similarity (only the lens group 40 being different), a lens diagram of the second embodiment is omitted. In the second embodiment, the incident angle of the highest principal ray with respect to the monochromatic filter 30 is 0.96°.

TABLE 2

| FNo. 1:10.4 Surface Number | f = 780.21 mm r | W = 0.3° d | fB = 219.37 mm n | vd |
|---|---|---|---|---|
| #1 | 320.500 | 11.00 | 1.56883 | 56.3 |
| #2 | −231.634 | 0.20 | | |
| #3 | −231.000 | 7.50 | 1.69895 | 30.1 |
| #4 | −873.165 | 341.88 | | |
| #5 | ∞ | 1.50 | 1.51633 | 64.1 |
| #6 | 82.630 | 65.70 | | |
| #7 | ∞ | 25.00 | 1.51633 | 64.1 |
| #8 | ∞ | 10.00 | | |
| #9 | ∞ | 4.40 | 1.51633 | 64.1 |
| #10 | −128.470 | | | |

[Third embodiment]

The numerical construction of the third embodiment is indicated in TABLE 3. FIGS. 5A–5C show aberrations of the third embodiment at the wavelength of 656.3 rm. The lens diagram of the third embodiment is not shown because of its similarity to the structure of the second embodiment. In the third embodiment, incident angle of the highest principal ray with respect to the monochromatic filter 30 is 1.12°.

TABLE 3

| FNo. 1:12.1 Surface Number | f = 1808.05 mm r | W = 0.1° d | fB = 154.64 mm n | vd |
|---|---|---|---|---|
| #1 | 1070.000 | 25.00 | 1.51633 | 64.1 |
| #2 | −643.674 | 2.00 | | |
| #3 | −647.700 | 21.00 | 1.62004 | 36.3 |
| #4 | −2717.914 | 1615.07 | | |
| #5 | ∞ | 1.50 | 1.51633 | 64.1 |
| #6 | 82.610 | 10.00 | | |
| #7 | ∞ | 20.00 | 1.51633 | 64.1 |
| #8 | ∞ | 10.00 | | |
| #9 | 82.610 | 4.00 | 1.51633 | 64.1 |
| #10 | ∞ | | | |

[Fourth embodiment]

The numerical construction of the fourth embodiment is indicated in TABLE 4. FIGS. 6A–6C show aberrations of the fourth embodiment. The lens diagram of the fourth embodiment is omitted since the structure is similar to that of the first embodiment. In the fourth embodiment, the incident angle of the highest principal ray with respect to the monochromatic filter 30 is 1.12°.

TABLE 4

| FNo. 1:20.0 Surface Number | f = 3000.00 mm r | W = 0.1° d | fB = 259.46 mm n | vd |
|---|---|---|---|---|
| #1 | 1070.000 | 25.00 | 1.51633 | 64.1 |
| #2 | −643.674 | 2.00 | | |
| #3 | −647.700 | 21.00 | 1.62004 | 36.3 |
| #4 | −2717.914 | 1615.07 | | |

TABLE 4-continued

| FNo. 1:20.0 Surface Number | f = 3000.00 mm r | W = 0.1° d | fB = 259.46 mm n | vd |
|---|---|---|---|---|
| #5 | ∞ | 1.50 | 1.51633 | 64.1 |
| #6 | 82.610 | 10.00 | | |
| #7 | ∞ | 20.00 | 1.51633 | 64.1 |
| #8 | ∞ | 10.00 | | |
| #9 | 250.000 | 4.00 | 1.51633 | 64.1 |
| #10 | −311.754 | | | |

The following TABLE 5 shows value of the concrete embodiments with respect to conditions (1) through (5). All of the embodiments satisfy conditions (1) through (5), and excellent performance can be obtained.

TABLE 5

| | Embodiment | | | |
|---|---|---|---|---|
| | 1 | 2 | 3 | 4 |
| fI | 500.4 | 500.4 | 1800.0 | 1800.0 |
| fII | −160.8 | −160.8 | −160.8 | −160.8 |
| fIII | 160.0 | 250.0 | 160.8 | 270.7 |
| L | 148.2 | 148.2 | 159.3 | 159.3 |
| Y | 2.73 | 4.09 | 3.15 | 5.24 |
| (1), (2)1/fII + 1/L | 0.00053 | 0.00053 | 0.000059 | 0.000059 |
| (3) fII/fI | −0.321 | −0.321 | −0.089 | −0.089 |
| (4) Y/fIII | 0.017 | 0.016 | 0.020 | 0.019 |
| (5) fIII/fII | −0.995 | −1.555 | −1.000 | −1.683 |

The present disclosure relates to subject matter contained in Japanese Patent Application No. HEI 9-361493, filed on Dec. 26, 1997, which is expressly incorporated herein by reference in its entirety.

What is claimed is:

1. A monochromatic image forming optical system for forming a monochromatic image on an image plane using a monochromatic filter, said optical system comprising:
   an objective lens group;
   a negative lens group located between said objective lens group and said image plane; and
   a positive lens group located between said negative lens group and said image plane,
   said monochromatic filter being located between said negative lens group and said positive lens group and passing only light within a predetermined wavelength range, wherein a light beam emitted from said negative lens group and passing through said monochromatic filter, is converged on said image plane by said positive lens group.

2. The monochromatic image forming optical system according to claim 1, wherein said objective lens group and said negative lens group constitute an afocal system on an image plane side, and wherein said positive lens group has a refractive power that counterbalances the negative power of said negative lens group.

3. The monochromatic image forming optical system according to claim 1, wherein said negative lens group satisfies condition (1);
   (1) $|1/fII+1/L|<0.01$,
   where
   fII is a focal length of said negative lens group; and
   L is a distance between a secondary principal point of said negative lens group and an image plane of said objective lens group.

4. The monochromatic image forming optical system according to claim 3, wherein said negative lens group further satisfies condition (2);
   (2) $0.00001<|1/fII+1/L|$,
   fII is a focal length of said negative lens group; and
   L is a distance between a secondary principal point of said negative lens group and an image plane of said objective lens group.

5. The monochromatic image forming optical system according to claim 1, wherein said objective lens group and said negative lens group satisfy condition (3);
   (3) $0.1<|fII/fI|<0.5$,
   where
   fII is a focal length of said negative lens group; and
   fI is a focal length of said objective lens group.

6. The monochromatic image forming optical system according to claim 1, wherein said positive lens group is selectable from a plurality of positive lens groups having different focal lengths.

7. The monochromatic image forming optical system according to claim 1, further comprising an observing device at the position of said image plane and wherein condition (4) is satisfied:
   (4) $0.005<Y/fIII<0.05$,
   where
   Y is a radius of an observing area of said observing device; and
   fIII is a focal length of said positive lens group.

8. The monochromatic image forming optical system according to claim 1, wherein condition (5) is satisfied;
   (5) $-2.0<fIII/fII<-0.5$,
   where
   fII is a focal length of said negative lens group; and
   fIII is a focal length of said positive lens group.

9. The monochromatic image forming optical system according to claim 1, wherein said negative lens group consists of a single negative lens.

10. The monochromatic image forming optical system according to claim 1, wherein said positive lens group consists of a single positive lens.

11. The monochromatic image forming optical system according to claim 1, wherein said objective lens group is used for an astronomical telescope.

12. The monochromatic imaging forming optical system according to claim 1, wherein a light beam emerging from said objective lens and incident onto said negative lens group emerges from said negative lens group as a substantially afocal light beam.

13. The monochromatic imaging forming optical system according to claim 1, said monochromatic filter comprising a narrow bandpass interference filter.

14. The monochromatic imaging forming optical system according to claim 1, said monochromatic filter passing only light within a predetermined narrow wave-length range.

15. A monochromatic filtering optical system for an observation optical system including an objective lens and a device for observing an image formed by said objective lens, said system comprising:
   a negative lens group located between said objective lens and said device;
   a positive lens group located between said negative lens and said device; and
   a monochromatic filter located between said negative lens group and said positive lens group, said monochromatic filter passing only light within a predetermined wavelength range, wherein a light beam emitted from said negative lens group and passing through said monochromatic filter, is converged on said image plane by said positive lens group.

16. The monochromatic filtering optical system according to claim 15, wherein condition (1) is satisfied;

(1) $|1/fII+1/L|<0.01$, where fII is a focal length of said negative lens group; and L is a distance between a secondary principal point of said negative lens group and said image plane of said objective lens.

17. The monochromatic filtering optical system according to claim 16, wherein condition (2) is satisfied;

(2) $0.00001<|1/fII+1/L|$, fII is a focal length of said negative lens group; and L is a distance between a secondary principal point of said negative lens group and an image plane of said objective lens group.

18. The monochromatic filtering optical system according to claim 15, wherein said negative lens group satisfy condition (3);

(3) $0.1<|fII/fI|<0.5$, where fII is a focal length of said negative lens group; and fI is a focal length of said objective lens.

19. The monochromatic filtering optical system according to claim 15, wherein condition (4) is satisfied:

(4) $0.005<Y/fIII<0.05$, where

Y is a radius of an observing area of said observing device; and fIII is a focal length of said positive lens group.

20. The monochromatic filtering optical system according to claim 15, wherein condition (5) is satisfied;

(5) $-2.0<fIII/fII<-0.5$, where fII is a focal length of said negative lens group; and fIII is a focal length of said positive lens group.

21. The monochromatic filtering optical system according to claim 15, wherein said objective lens group and said negative lens group constitute an afocal system on an image plane side, and wherein said positive lens group has a refractive power that counterbalances the negative power of said negative lens group.

22. The monochromatic filtering optical system according to claim 15, wherein a light beam emerging from said objective lens and incident onto said negative group emerges from said negative lens group as a substantially afocal light beam.

23. The monochromatic filtering optical system according to claim 15, said monochromatic filer comprising a narrow bandpass interference filter.

24. The monochromatic imaging forming optical system according to claim 15, said monochromatic filter passing only light within a predetermined narrow wave-length range.

* * * * *